United States Patent
Song et al.

(10) Patent No.: US 8,358,271 B2
(45) Date of Patent: Jan. 22, 2013

(54) OPTICAL NAVIGATION SYSTEM WITH LIFT DETECTION

(75) Inventors: Willie Song, Penang (MY); Siew Fong Ng, Kedah (MY); Beng Chye Lye, Penang (MY); Zi Hao Tan, Penang (MY)

(73) Assignee: Avago Technologies ECBU (Singapore) Pte. Ltd., Singapore (SG)

(*) Notice: Subject to any disclaimer, the term of this patent is extended or adjusted under 35 U.S.C. 154(b) by 364 days.

(21) Appl. No.: 12/820,581

(22) Filed: Jun. 22, 2010

(65) Prior Publication Data

US 2011/0310018 A1    Dec. 22, 2011

(51) Int. Cl.
  *G06F 3/033* (2006.01)
(52) U.S. Cl. ............... 345/166; 345/175; 345/48
(58) Field of Classification Search ............ None
  See application file for complete search history.

(56) References Cited

U.S. PATENT DOCUMENTS

| | | | |
|---|---|---|---|
| 8,179,369 B2 * | 5/2012 | Kwak et al. | 345/166 |
| 2006/0007155 A1 | 1/2006 | Raynor et al. | |
| 2007/0290991 A1 | 12/2007 | Bieber et al. | |
| 2007/0291001 A1 | 12/2007 | Trisnadi et al. | |
| 2009/0128488 A1 | 5/2009 | Ang et al. | |
| 2009/0135140 A1 | 5/2009 | Constantin et al. | |

* cited by examiner

*Primary Examiner* — Muhammad N Edun

(57) ABSTRACT

An optical navigation system with a lift detection module is provided for preventing cursor movement if the optical navigation system has been lifted from the navigation surface. The optical navigation system may include an image sensor, a controller and a lift detection module. The lift detection module may be operatively coupled with the image sensor and the controller to selectively report a motion data upon determining a lift by comparing the average of the photosensitive pixel elements with a pixel element threshold value and the surface quality value with a surface quality threshold value. The lift detection module may be incorporated in a microcontroller, wherein the microcontroller may be added to a navigation system to provide an additional lift detection feature.

14 Claims, 3 Drawing Sheets

OPTICAL NAVIGATION SYSTEM WITH LIFT DETECTION

BACKGROUND

The application of an optical navigation system for use in a computer mouse for navigating a cursor has become almost universal. Optical navigation system tracks the movement of the optical navigation system relative to the target surfaces such as a mouse pad or a work surface. A typical optical navigation system uses a light source and an image sensor to successively capture frames of image data of the target surface. The optical navigation system compares the successive image frames and determines the relative movements between the optical navigation system and the target surface based on these image frames. The navigation system subsequently processes and further translates the movement data to a cursor movement on the computer.

With an input device such as an optical mouse which is manually manipulated, there is a need to recognize when the mouse has been lifted off the navigation surface, during repositioning or when the mouse is moved away from the edge of the navigating surface. It is important to have the navigation operation to be temporarily suspended during lifting without moving the cursor. Therefore, in order for the input device to perform properly, it is crucial to detect the lift from the target surface beyond a certain height and be able prevent a mouse from tracking to avoid cursor skating.

There are conventional lift detection techniques that can be implemented on a navigation system in order to prevent the mouse from tracking that may be based on image defocus or image surface quality value. However, these lift detection techniques typically involve complex steps and are usually integrated as part the system during the chip design.

SUMMARY

An optical navigation system with a lift detection module is provided that is capable of preventing cursor movement when the optical navigation system has been lifted from the navigation surface. When an optical navigation system, for example, a mouse, has been lifted above a certain height threshold from the navigation surface during repositioning, the lift detection module will suppress the report of the motion data generated and temporarily suspend cursor movement, in order to prevent the cursor from moving or to avoid cursor skating.

In one embodiment, the optical navigation system may include an image sensor, a controller and a lift detection module. The image sensor may have photosensitive pixel elements configured to capture an image of a navigation surface. The controller may be coupled to the image sensor configured to determine an average for the photosensitive pixel elements used for acquiring the image and also to determine a surface quality value for that image. The lift detection module may be configured to receive the average of the photosensitive pixel elements and the surface quality value, and operable to selectively report motion data upon determining a lift by comparing the average of the photosensitive pixel elements with a threshold value of pixel elements and the surface quality value with a threshold surface quality value. The lift detection module may report a lift when the average of the photosensitive pixel elements is lower than the threshold value of pixel elements and the surface quality value of the image captured is lower than the threshold surface quality value.

Embodiments of a method for lift detection are also described. One embodiment of the method may include identifying a motion of an input device relative to a navigation surface; capturing an image of the navigation surface; determining an average for the photosensitive pixel elements used for acquiring the image; determining a surface quality value for the image; comparing the average of the photosensitive pixel elements with a threshold value of pixel elements and the surface quality value with a threshold surface quality value; and selectively reporting motion data of the input device based on the comparison.

BRIEF DESCRIPTION OF THE DRAWINGS

Throughout the description and figures, similar reference numbers may be used to identify similar elements.

DETAILED DESCRIPTION

Figure 1:
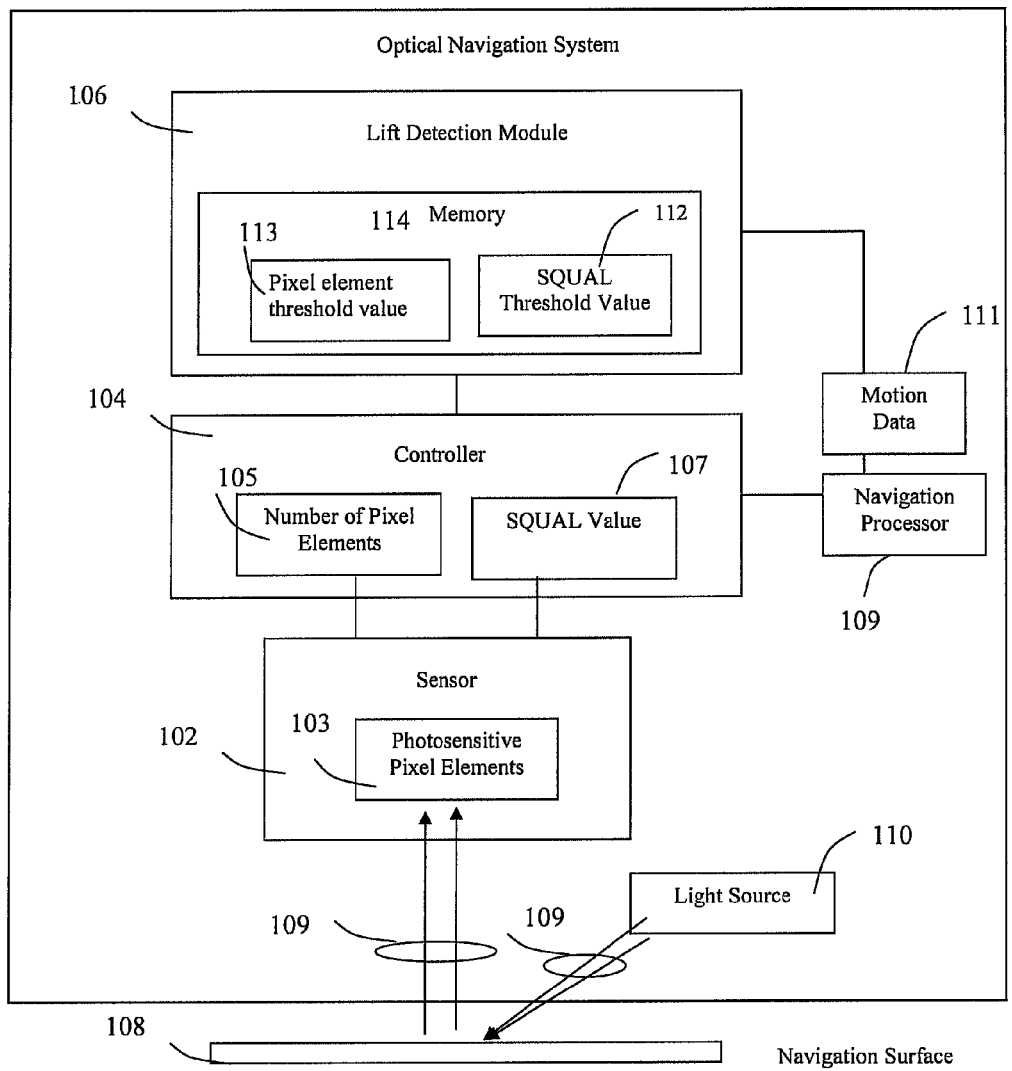
FIG. 1 illustrates a schematic block diagram of one embodiment of an optical navigation system with lift detection.

Although certain component parts are shown in conjunction with the optical navigation system 100 of FIG. 1, other embodiments may implement fewer or more component parts for providing a similar lift detection function. FIG. 1 illustrates a schematic block diagram of an optical navigation system 100 with lift detection. The optical navigation system 100 may include an image sensor 102, a controller 104 and a lift detection module 106. In one embodiment, the optical navigation system 100 may be implemented as an integrated chip system or a single chip system whereby the image sensor 102, the controller 104 and the lift detection module 106 may be integrated as a single integrated circuit (IC) chip. An optical navigation system 100 may be used in many input devices, such as a mouse, an optical finger navigation system for navigation, or other similar input devices. However, in order to simplify the illustration, a mouse will also be used to represent the input device in the description of the embodiments.

The optical navigation system 100 may be utilized in a mouse to track the movement of the mouse relative to a navigation surface 108 on which the mouse is manually manipulated. Optical navigation system 100 may track the movement of the mouse relative to the navigation surfaces 108, such as a mouse pad, a work surface, or other similar navigational surfaces. The optical navigation system 100 may include a light source 110 to illuminate the navigation surface 108 and an image sensor 102 to capture frames of image data of the navigation surface 108. The optical navigation system 100 may compare successive image frames captured and determine the relative motion between the mouse and the navigation surface 108 in terms of movement vectors in the directional delta X and delta Y, corresponding to the movement of the mouse relative to the navigation surface 108. The optical navigation system 100 may subsequently process and further translate the motion data 111 to a corresponding cursor movement on the computer (not shown).

In operation, the light source 110 may emit light onto navigation surface 108. The light source 110 may be any suitable source of electromagnetic radiation, which is capable of emitting light at a desirable wavelength and intensity. The mouse may also include one or more lenses 109 to focus the light emitted by the light source 110 onto the navigation surface 108, as well as directing light reflected from the navigation surface 108 onto the image sensor 102. The image sensor 102 may be configured to electronically capture image frames of the illuminated area of the navigation surface 108. The image sensor 102 may be a CCD (Charge Coupled Device), a CMOS (Complimentary Metal Oxide Semiconductor), or any type of optical sensor known in the art.

In one embodiment, the image sensor 102 may include a plurality of photosensitive pixel elements 103 configured to receive light reflected from the navigation surface 108 and subsequently generate a signal in response to the respective light received. The image sensor 102 may generate a signal which may vary in magnitude in relation to the intensity of the light received by the photosensitive pixel element 103. Individual photosensitive pixel elements 103 of the image sensor 102 may each capture a portion of the image. All photosensitive pixel elements 103 of the image sensor 102 may be combined to form a complete image. In general, in order to allow for proper tracking, the size of the photosensitive pixel element 103 may have an array that is large enough to receive an image having sufficient features. The size of the array may also be dependent on the type of application and the performance requirements of the optical navigation system 100. For example, a mouse with an image sensor 102 having a high quality navigation performance may require a 20×20 array or a 30×30 array of photosensitive pixel elements 103.

In one embodiment, the optical navigation system 100 may include a controller 104 coupled to the image sensor 102. The controller may be configured to determine an average for the photosensitive pixel elements 105 used for acquiring the image and a surface quality value 107 or SQUAL value 107 from the image captured by the image sensor 102. For performing a navigation operation, the navigation processor 109 may cross-correlate multiple successive image frames captured by the image sensor 102 and generate relative motion data 111. The photosensitive pixel elements of the image sensor 102 that are integrated to produce the image may be referred to as the average of active photosensitive pixel elements 105 used for acquiring the image.

In another embodiment, the controller 104 may be further configured to determine a surface quality value 107 or SQUAL value 107 for the image captured by the image sensor 102. A SQUAL value 107 is the number of surface quality features of the image captured by the image sensor 102, such features are the patterns appearing in the captured image that is caused by microscopic textures of the navigation surface 108. For example, the microscopic textures of the navigation surface 108 may cause bright and dark regions, which may create some clear contrast features within the image itself. Thus, the SQUAL value 107 may be used as an indicator to determine whether a region of a given navigation surface 108 that may be effectively used by the optical navigation system 100 to perform a navigation operation. For example, if the navigation system 100 is lifted off the navigation surface 108, the image captured by the image sensor 102 will have a low SQUAL value 107, if not zero. When the navigation system 100 has been lifted, the image sensor 102 may not be able to adequately capture an image of the navigation surface 108 thus there will be little or no surface features in the captured image for the system to cross-correlate. Therefore, in order to perform a proper tracking, the SQUAL value 107 should be above a certain minimal SQUAL value.

In one embodiment, a lift detection module 106 may be coupled with the controller 104 to determine if the optical navigation system 100 has been lifted from the navigation surface 108 and to prevent cursor movement on a corresponding computer (not shown), if a lift has been detected. If the navigation system 100 has been lifted above a certain height from the navigation surface 108 during repositioning, the lift detection module 106 will suppress the report of the motion data 111 generated by the processor 109 and temporary suspend the cursor movement in order to prevent the cursor from moving or to avoid cursor skating. The lift detection module 106 may be coupled with the controller 104 to perform the lift detection by comparing the average of pixel elements 105 that is integrated for acquiring the image against a predetermined pixel element threshold value 113 and the SQUAL value 107 of the image captured by the image sensor 102 against a predetermined SQUAL threshold value 112. In one embodiment the lift detection module 106 reports a lift if the average of the photosensitive pixel elements 105 is lower than the pixel elements threshold value 113 and the SQUAL value 107 of the image captured is lower than the SQUAL threshold value 112.

In one embodiment, the pixel element threshold value 113 is a predetermined average of photosensitive pixel elements 105 of the image sensor 102 that are integrated to successfully acquire an image. For example, the pixel element threshold value 113 may be estimated through experiment by calculating the average of pixel elements 105 that are needed by the navigation system 100 for acquiring an image using various navigation surfaces 108. The pixel element threshold value 113 may be stored in memory 114 for lift detection comparison. The SQUAL threshold value 112 is a predetermined SQUAL value 107, for example, representing the minimum number of surface quality features of the image captured by the image sensor 102 that will permit the navigation processor 109 to perform a cross correlation on the captured image frames. The SQUAL threshold value 112 may also be estimated through experiment by determining the SQUAL value 107 of an image captured by the image sensor 102 at the maximum operational height whereby the navigation processor 109 is still able to perform a navigation operation. The SQUAL threshold value 112 may be stored in memory 114 for lift detection comparison.

Figure 2:
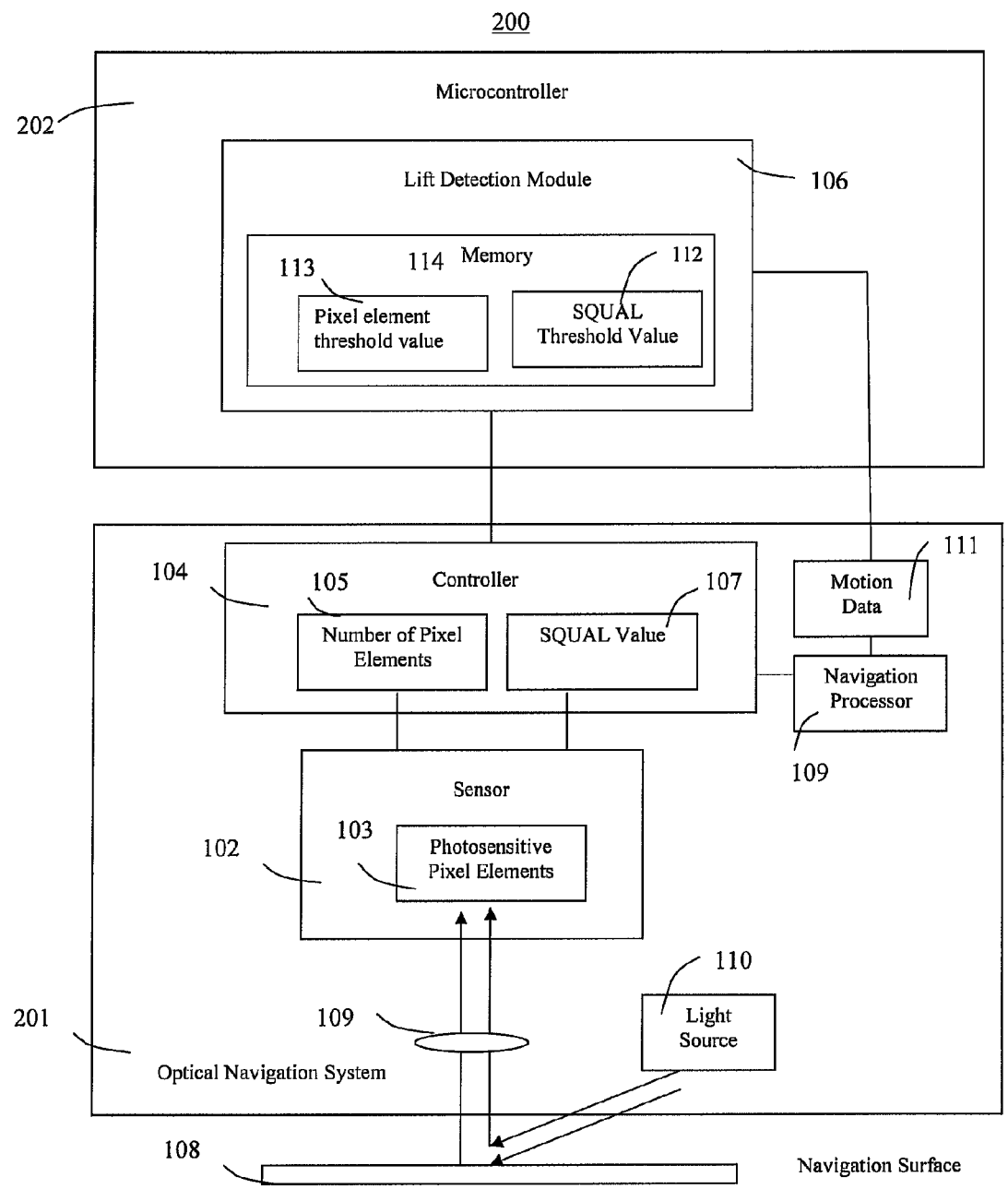
FIG. 2 illustrates a block diagram of another embodiment of a an optical navigation system with lift detection.

FIG. 2 shows a schematic block diagram of an input device 200 comprising at least a navigation system 201 and a microcontroller 202. In this embodiment, the microcontroller 202 may include a lift detection module 106 and may be operatively coupled to the navigation system 201. In one embodiment, the microcontroller 202 may be configured to provide a lift detection feature to the navigation system 201 by preventing the navigation system 201 from reporting out the cursor motion data 111 if it has been lifted from a navigation surface 108. The microcontroller 202 may provide a flexible means for adding an extra lift detection function to a navigation system 201, which previously did not have such a feature as part of the device. The existing navigation system 201 may be utilized and further given a lift detection feature for preventing the cursor skating without having to redesign the system. A lift detection feature may be added to an existing navigation system 201 design with minimal work, thus saving design cost, size, and time. In particular, the addition of microcontroller 202 provides a desirable low cost lift detection solution, while maintaining the original size of the image sensor 202. Various components of the navigation system 201 and the navigation operation have been described with respect to FIG. 1 in previous paragraphs.

In one embodiment, lift detection module 106 may be configured to determine an average for the photosensitive pixel elements 105 used for acquiring the image and the SQUAL value 107 of the image captured. The lift detection module 106 subsequently compares the average of photosensitive pixel elements 105 against a pixel element threshold value 113 and the SQUAL value 107 against a SQUAL threshold value 112. The lift detection module 106 may be configured to report the lift of the navigation system 201 upon determining the average of photosensitive pixel elements 105 is lower than the pixel element threshold value 113 and the SQUAL value is lower than the SQUAL threshold value 112. In one embodiment, both the pixel element threshold value 113 and the SQUAL threshold value 112 may be estimated via experiment and stored in memory 114 of the microcontroller 202 for comparison. For example, the lift detection module 106 may be implemented into a microcontroller 202 in the form of an algorithm or as firmware. The predetermined pixel element threshold value 113 and the SQUAL threshold value 112 may also be stored in the lift detection module 106 as part of firmware.

Figure 3:
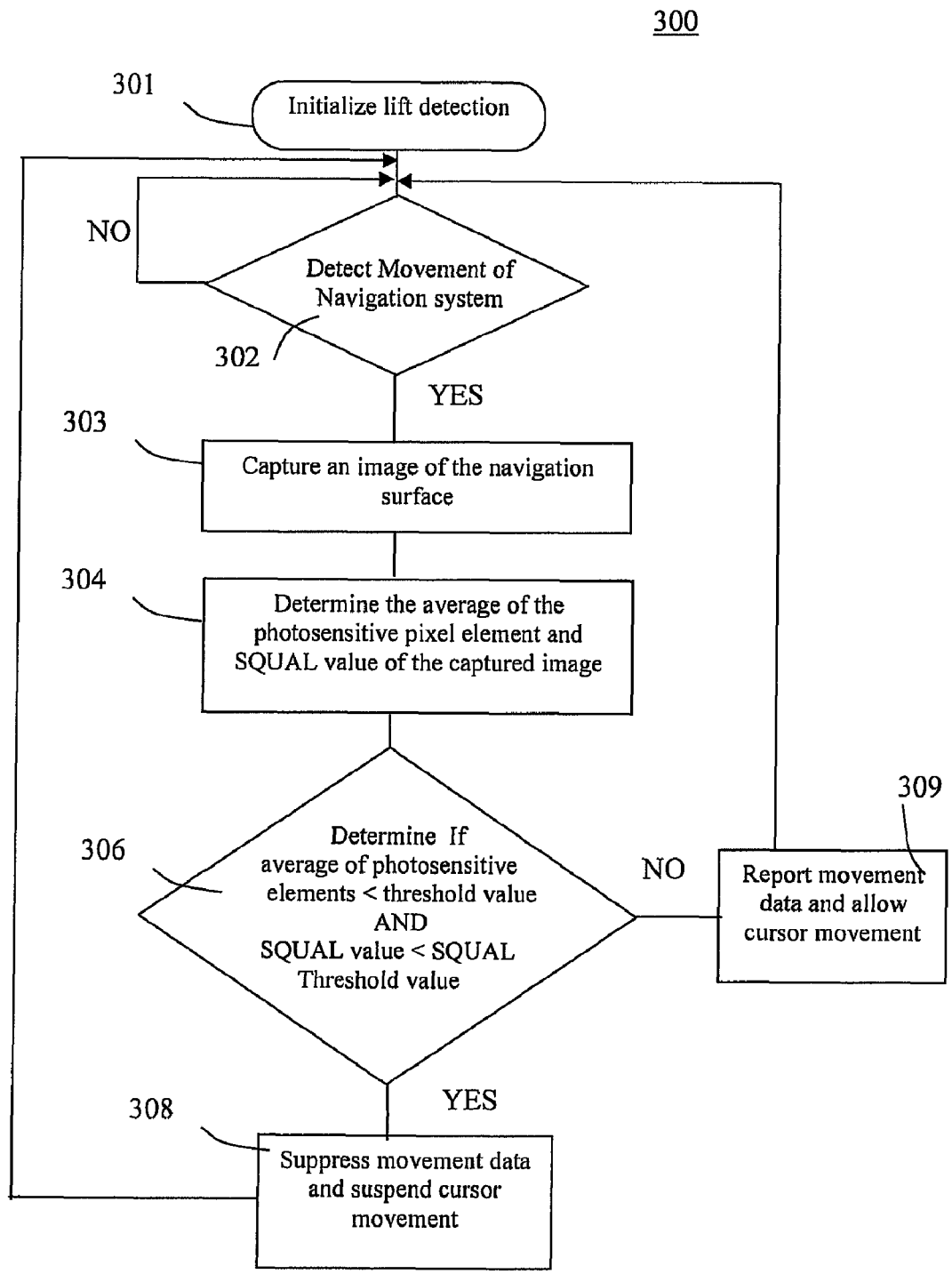
FIG. 3 illustrates a flow chart of a method of lift detection operation.

FIG. 3 illustrates a block diagram of one embodiment of a method 300 for lift detection. At block 301, the navigation system lift detection module 106 initializes as the navigation system 100 is moved over navigation surface 108. At block 302, the navigation system 100 determines a motion of the input device relative to the navigation surface 108 and initializes the lift detection function. At block 303, an image from the navigation surface 108 is captured by the image sensor 102 photosensitive elements; wherein each of the photosensitive pixel elements 105 of the image sensor 102 captures a portion of the image and all are subsequently combined to form a complete image. The image sensor 102 may capture the image by receiving the reflected light from the navigation surface 108 and generate an image signal in response to the respective light received.

At block 304, the controller 104 may determine the average of photosensitive pixel elements 105 used by the image sensor 102 for acquiring the image and a surface quality value 107 or SQUAL value 107 of the image captured by the image sensor 102. A surface quality value 107 is the number of surface quality features of the image captured by the image sensor 102 that can be effectively used for image correlation and to provide a navigation operation. At block 306, the lift detection module 106 detects a lift by comparing the determined average of photosensitive pixel elements 105 against a pixel element threshold value 113 and the SQUAL value 107 of the image captured by the image sensor against a SQUAL threshold value 112. In one embodiment, the pixel element threshold value 113 is a predetermined average of photosensitive pixel elements 105, which can be estimated by experiment and stored in the memory 114 for comparison. The SQUAL threshold value 112 may be a predetermined SQUAL value 107 representing the minimum number of surface quality features of the image captured by the image sensor 102 to allow the optical navigation system 100 to perform a cross correlation of image frames and may be estimated through experiment and stored in a memory 114 for comparison. The lift detection module 106 reports a lift if the average of photosensitive pixel elements 105 is lower than the pixel element threshold value 113 and the SQUAL value 107 is lower than the SQUAL threshold value 112.

At block 308, if a lift is detected, the lift detection module 106 suppresses the report of the motion data generated by the processor and suspends the cursor movement. If a lift is not detection, the navigation system 110 reports the movement data and allows cursor movements in accordance to normal navigation operations, as indicated in block 309. If both the average set number of pixel elements 105 and the SQUAL value 107 exceeds the respective predetermined threshold values, the navigation system permits a normal cursor movement.

Although the operations of the methods herein are shown and described in a particular order, it will be understood by those skilled in the art, that the order of each method may be altered, for example, so that certain operations may be performed in a different, in an inverse order, or so that certain operations may be performed, at least in part, concurrently with other operations.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation system, comprising:
   an image sensor having photosensitive pixel elements configured to capture an image of a surface;
   a controller coupled to the image sensor, the controller configured to determine an average of photosensitive pixel elements used for acquiring the image, the controller further configured to determine a surface quality value for the image;
   a lift detection module configured to receive the average of the photosensitive pixel elements and the surface quality value, wherein the lift detection module is operable to selectively report motion data upon determining a lift by comparing the average of the photosensitive pixel elements with a pixel element threshold value and the surface quality value with a surface quality threshold value.

2. The system of claim 1, wherein the lift detection module is configured to determine whether the average of the photosensitive pixel elements is lower than the pixel element threshold value.

3. The system of claim 2, wherein the pixel element threshold value is a predetermined minimum average of photosensitive pixel elements that are integrated to successfully acquire an image.

4. The system of claim 1, wherein the lift detection module is configured to determine whether the surface quality value is lower than the surface quality threshold value.

5. The system of claim 4, wherein the surface quality threshold value is a predetermined minimum surface quality value for proper tracking.

6. The system of claim 1, wherein the lift detection module is further configured to suppress the report of motion data upon determining the average of the photosensitive pixel elements is lower than the predetermined pixel element threshold value and the surface quality value is lower than the predetermined surface quality threshold value.

7. The system of claim 1, further comprising a memory configured to receive and store the predetermined threshold value of the photosensitive pixel elements and the threshold value of the surface quality value.

8. An optical input device, comprising:
   a light source;
   a sensor having photosensitive pixel elements configured to capture an image of a surface;
   a controller operably connected to the sensor, the controller being configured to determine an average of the photosensitive pixel elements used for acquiring the image, the controller being further configured to determine a surface quality value for the image;
   a microcontroller operable to determine the operational height of the input device from the surface; and
   a navigation processor configured to generate motion data and provide navigation operation;
   wherein the microcontroller comprises a lift detection module configured to receive the average of the photosensitive pixel elements and the surface quality value and configured to selectively report a motion data upon determining a lift by comparing the average of the photosensitive pixel elements with a pixel element threshold value and the surface quality value with a surface quality threshold value.

9. The optical input device of claim 8, wherein the microcontroller comprises a lift detection module configured to receive the average of the photosensitive pixel elements and the surface quality value and configured to selectively report a motion data upon determining a lift by comparing the average of the photosensitive pixel elements with a pixel element threshold value and the surface quality value with a surface quality threshold value.

10. The optical input device of claim 8, wherein the lift detection module is configured to determine whether the average of the photosensitive pixel elements is lower than the pixel element threshold value.

11. The optical input device of claim 10, wherein the pixel element threshold value is a predetermined minimum average of photosensitive pixel elements that are integrated to successfully acquire an image.

12. The optical input device of claim 8, wherein the lift detection module is configured to determine whether the surface quality value is lower than the surface quality threshold value.

13. The optical input device of claim 8, wherein the surface quality threshold value is a predetermined minimum surface quality value for proper tracking.

14. The optical input device of claim 8, wherein the lift detection module is configured to suppress the motion data upon determining the average of the photosensitive pixel elements is lower than the predetermined pixel element threshold value and the surface quality value is lower than the predetermined surface quality threshold value.

* * * * *